Aug. 11, 1959 — A. THAON DE SAINT-ANDRÉ — 2,899,041
CONVEYORS FOR AUTOMOBILE VEHICLES

Filed Jan. 17, 1957 — 4 Sheets-Sheet 1

INVENTOR
André Thaon de Saint-André
BY
Brown & Seward
ATTORNEYS

Aug. 11, 1959  A. THAON DE SAINT-ANDRÉ  2,899,041
CONVEYORS FOR AUTOMOBILE VEHICLES
Filed Jan. 17, 1957  4 Sheets-Sheet 2

INVENTOR
André Thaon de Saint-André
BY
Brown & Seward
ATTORNEYS

Aug. 11, 1959 A. THAON DE SAINT-ANDRÉ 2,899,041
CONVEYORS FOR AUTOMOBILE VEHICLES
Filed Jan. 17, 1957 4 Sheets-Sheet 3

INVENTOR
André Thaon de Saint-André
BY
Brown & Reward
ATTORNEYS

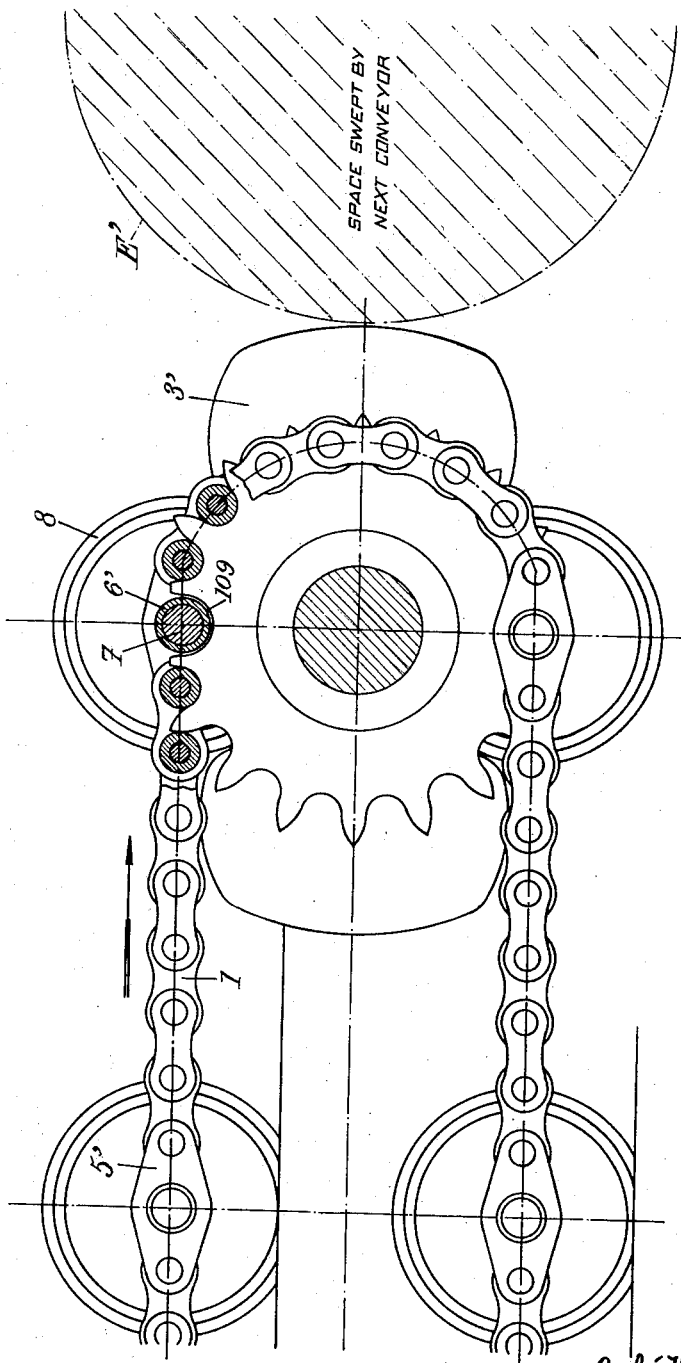

United States Patent Office 2,899,041
Patented Aug. 11, 1959

2,899,041

CONVEYORS FOR AUTOMOBILE VEHICLES

André Thaon de Saint-André, Montreux-Clarens, Switzerland

Application January 17, 1957, Serial No. 634,788

Claims priority, application Switzerland January 20, 1956

11 Claims. (Cl. 198—183)

Many parking systems require the horizontal conveying of cars in a direction at right angles to the direction of driving of said cars and, in many cases, the cars must pass from one conveyor to another one located adjacent thereto.

The chief object of my invention is to provide a conveyor system which is strong, economical, occupies a relatively small height, and permits an easy passage of a car from one conveyor to another one located adjacent thereto.

The conveyor according to my invention includes two endless chains controlled by two sprocket wheels which are disposed coaxially, have the same number of teeth, and are in register with each other. Said endless chains include, at distances from one another equal to one half of the circumference of said sprocket wheels, fixation links for connection with transverse bars serving to support the cars, said transverse bars being rotatable about their respective axes with respect to the fixation links in which they are mounted. These transverse bars are supported by rollers running along rails parallel to the horizontal portions of said endless chains respectively. The sprocket wheels are carried by a rigid shaft of a special shape, the central portion of which has, over a length at least equal to that of said transverse bars, a surface corresponding substantially to the surface enveloped by said bars in a reference system fixed with respect to said sprocket wheels so as to rotate with respect thereto.

Other features of my invention will become apparent in the course of the following detailed description of some specific embodiments thereof, with reference to the accompanying drawings, given merely by way of example and in which:

Figs. 13 and 14 are explanatory views relative to the shape of the shaft interposed between the sprocket wheels.

Figure 1:
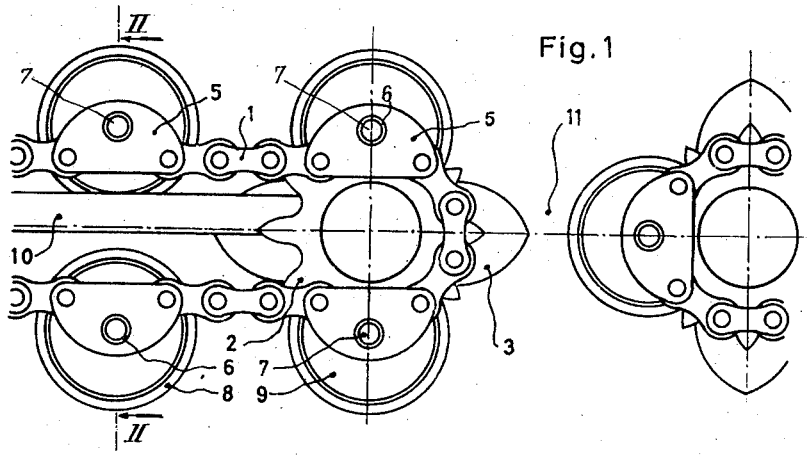
Fig. 1 is an elevational view of a portion of a conveyor for motor cars made according to my invention.
Figure 2:
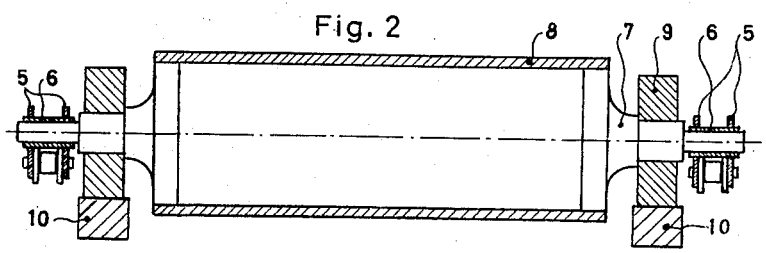
Fig. 2 is a cross section of the conveyor on the line II—II of Fig. 1.
Figure 3:
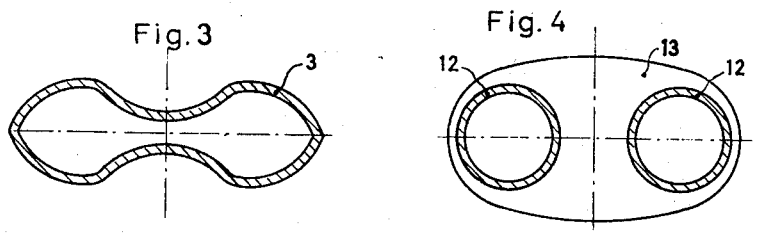
Figs. 3 and 4 show two different shapes of the shaft on which are mounted the sprocket wheels of the conveyor.

The conveyor illustrated by Figs. 1 to 3 includes two endless chains 1 driven by sprocket wheels 2 fixed at the ends of a driving shaft 3. Sprocket wheels 2 have the same even number of teeth and they are in register with each other, i.e. their teeth are located on the same lines parallel to the common axis of said wheels. Chains 1 are provided, at distances corresponding to one half of the circumference about which the chains are wound on sprocket wheels 2, with fixation links 5 the length of which is, in this embodiment of my invention, equivalent to that of two ordinary chain links when said links are passing on one sprocket wheel 2 (that is to say slightly smaller than twice the length of an ordinary link, so as to permit a correct meshing on sprocket wheels 2).

The two side plates which constitute every fixation link 5 are connected together by a sleeve 6 extending therethrough and in which is journalled a stub axle 7 rigid with a transverse tube 8 forming a supporting bar.

Rollers 9, freely rotatable about stub axles 7, run on rails 10 and support the weight of the cars carried by the conveyor, whereas chains 1 serve to move said cars transversely.

In this embodiment of my invention, in order to prevent the ends of stub axles 7 from interfering with sprocket wheels 2, the side plates of fixation links 5 are made of a height (meaning the vertical dimension thereof when the portions of the chains that carry said links are moving along straight horizontal paths) greater than the height of ordinary chain links and the sleeves 6 extending between said side plates and through which said axles 7 are journalled in said links 5 are off-set outwardly with respect to the chain, so that said sleeves 6 can pass between two teeth of wheels 2 without coming into contact with the bottom of the hollow between said two teeth.

In these conditions, two successive supporting tubes 8 assume diametrally opposed positions when the fixation links 5 in which they are mounted are passing on sprocket wheels 2 since, as above stated, the distance between two consecutive fixation links 5 of the chains is equal to one half of the circumference about which said chains are wound on said sprocket wheels. The input shaft 3 has a special cross section, that is to say it is flattened and widened in its middle part, so as to constitute a kind of two-tooth gear meshing with supporting tubes 8. The manner in which this cross section is obtained will be described below.

It will be noted that, owing to this shape of shaft 3, the edges thereof project into the gap 11 between two adjacent conveyors and contribute in bridging this gap.

Figure 4:
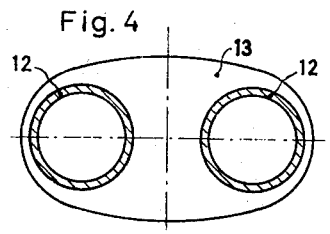

In the construction of Fig. 4, the cross section of the shaft is simplified and consists of two tubes 12 welded at their ends to side plates 13.

Figure 5:
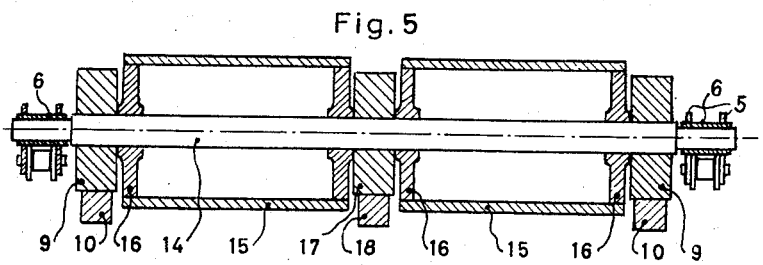
Fig. 5 is a cross sectional view of a conveyor according to my invention including three supporting rails.

As a rule, there is one conveyor element for each car axle, and the transverse supporting bars 8 are made of a length sufficient to accommodate cars of different wheelbases. However, in the case where this condition would lead to giving the supporting bars too great a length in view of the loads to be supported, I may, as shown by Fig. 5, connect every two corresponding fixation links 5 by a shaft 14 on which are journalled end rollers 9, running on rails 10 as in the first described embodiment, said shaft 14 further carrying in its middle part other rollers 17 running along a central rail 18. In this case, each supporting bar 8 of the preceding embodiment is replaced by two half bars 15 provided with end plates 16 journalled on shaft 14.

Figure 6:
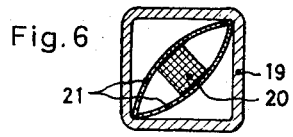
Fig. 6 is a cross section of a special supporting bar for a conveyor according to my invention.

At the places where persons may have to walk on the conveyors, it is desirable to avoid the danger of accidents caused by the round shape of the supporting tubes. In the construction illustrated by Fig. 6, I replace at such places the round tubes as above described by tubes 19 of square cross-section, of corresponding dimensions, journalled on shafts 20 which are fixed in the corresponding fixation links (such as 5). Portions of said shafts 20, located inside square tubes 19, are of square cross-section. Spring blades 21, engaged diagonally in every square tube 19, bear against the flat surfaces of shaft 20 and thus yieldingly hold square tube 19 in fixed position with respect to said shaft 20.

Figure 7:
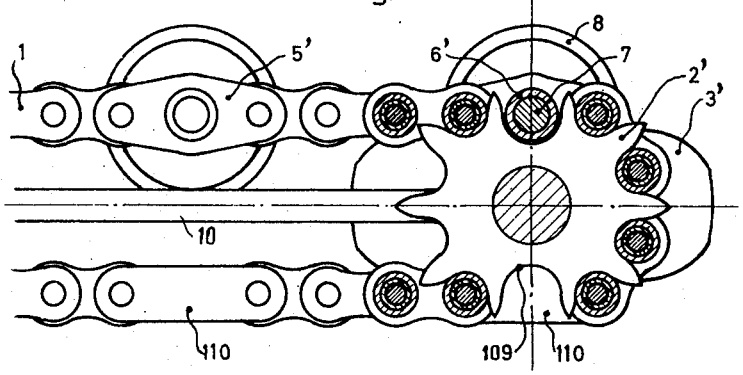
Figs. 7 and 8 are views similar to Fig. 1 and corresponding to two other embodiments of my invention.
Figure 8:
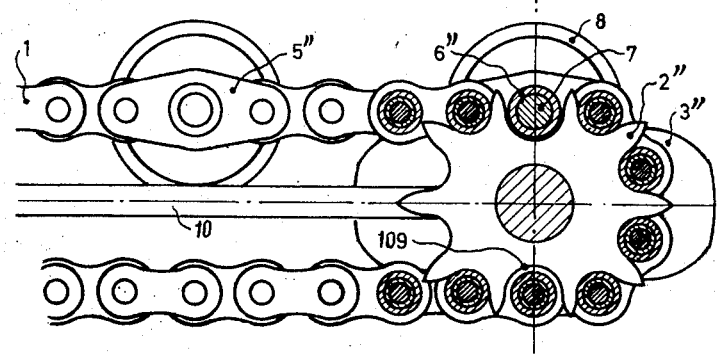

In the embodiments of my invention illustrated by Figs. 7 and 8 the sleeves mounted in the fixation links to receive the stub axles 7 of tubes 8 are not off-set outwardly as in the embodiment of Figs. 1 to 3. Since the hollows between the teeth of an ordinary sprocket wheel are not sufficiently deep to accommodate a sleeve thus positioned in the middle part of a fixation link of a length at least approximately equal to twice that of an ordinary chain link, I provide each sprocket wheel with two diametrically opposed notches 109 deeper than the other hollows of the wheel so as to supply clearance for said sleeves.

In the construction of Fig. 7, the sleeves 6' in which axles 7 are journalled are located in the middle planes of straight fixation links 5' of a length corresponding, as in the case of Fig. 1, to that of two ordinary links when they are passing around sprocket wheel 2', that is to say slightly smaller than twice the length of an ordinary link. In this case, the teeth of sprocket wheels 2' (with the exception, of course, of those adjoining notches 109) are of conventional shape.

In this case, if there are portions of the endless chain 1 where there are no fixation links such as 5', it is necessary to provide in these portions of the chain double links 110, of the same length as fixation links 5', and located at the places where such fixation links would be located. An ordinary continuous chain could not mesh correctly with the portions of a sprocket wheel such as 2' extending over notches 109 because chain links tend to place themselves in line with one another and this would give the whole of two successive ordinary links a length greater than that existing between the two hollows of toothed wheel 2' located respectively before and after a notch 109.

In the construction of Fig. 8, which is similar to that of Fig. 7 concerning the shape of the fixation links, the length of said links 5" is equal to exactly twice that of an ordinary link of the chain, but in this case it is necessary to give the teeth of each sprocket wheel 2" a special shape, the angle separating two consecutive hollows between which an ordinary link extends being slightly smaller than the theoretical angle in conventional sprocket-wheels and the angle separating the hollows located respectively before and after a notch 109 being a little greater than twice said theoretical angle.

In this case, the portions of the endless chain where there are no fixation links 5" may be constituted entirely by ordinary links which mesh correctly with the sprocket wheel when any two of them, in line with each other, are passing over a notch 109.

It is pointed out that, with a construction such as illustrated by Fig 7 or Fig. 8, for a given overall height of the conveyor (this height being equal to twice the distance from the horizontal plane passing through the axis of sprocket wheels 2', or 2", to the horizontal plane tangent to the tops of the tubes 8 travelling above rails 10) the sprocket wheels are so dimensioned that the radius of the cylinder along which the chains are wound thereon is substantially greater than in a construction such as illustrated by Fig. 1. Shaft 3', or 3", can therefore be made of greater dimensions and in particular its width (horizontal dimension in the position of Fig. 7, or Fig. 8) can be made equal to the height of the conveyor so that it has the same effect as a tube 8 in bridging the gap between the conveyor and an adjacent one.

It should be noted that sleeve 6', or 6", can be made of relatively small diameter since it serves merely to support an axle 7 journalled therein. Therefore the notches 109 intended to accommodate said sleeves 6', or 6", need not be very large.

Finally a chain as shown by Fig. 7 and especially one as shown by Fig. 8 does not include many special elements, these elements being the double links (5' and 110 in the case of Fig. 7 and 5" in the case of Fig. 8) and the sleeves (6' or 6") in which axles 7 are journalled.

Figure 13:
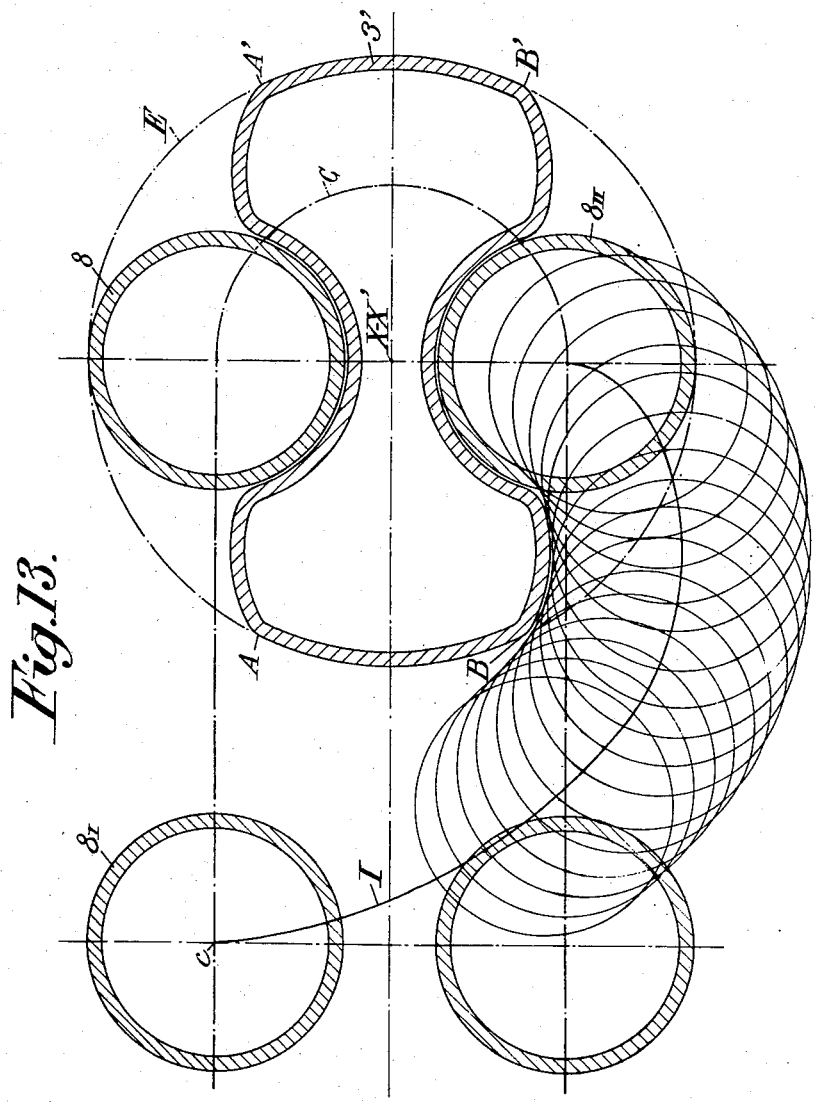

I will now explain, with reference to Fig. 13, how the cross section of the shaft extending between the sprocket wheels is determined, the example taken to give this explanation corresponding to the embodiment of Fig. 7.

As above stated, this cross section must be such that the outer surface of this shaft 3' corresponds with the surface enveloped by bars or tubes 8 in a reference system fixed with respect to said sprocket wheels 2' so as to rotate with respect thereto.

The easiest way to find the surface which constitutes the envelope of bars 8 in a reference system fixed with respect to the sprocket wheels and therefore to shaft 3' is to suppose that the whole mechanism is given a rotation about the axis X—X' of said shaft and said sprocket wheels with an angular speed opposed, and equal in absolute value, to that of shaft 3'. Then shaft 3' and the sprocket wheels become stationary and the chain has a composite movement of rotation about axis X—X' and of meshing with the sprocket wheels and with shaft 3'. During the period of time corresponding to a rotation of 180°, the bar designated by $8_I$ (at the top and on the left of Fig. 13) comes to be engaged in the hollow of shaft 3', i.e., in the position shown at $8_{II}$. In the course of this displacement, the center $c$ of the cross section of said bar moves along a curve I which is an involute of the circle C around which the chain passes. The successive positions of bar $8_I$ during this movement are shown by circles, which envelope the portion BB' of shaft 3.

Of course shaft 3' must not extend beyond the cylindrical outer surface E swept by bars 8 when shaft 3' is rotating about its axis X—X'. This is why the surface corresponding to the above defined envelope extends only from A to A' and from B to B', portions AB and A'B' of the outer surface of shaft 3' being portions of said cylindrical surface E.

Fig. 14 shows that this shape of the cross section of shaft 3' is that giving the smallest possible gap with the space swept by the corresponding end of the next conveyor.

In the case of the embodiment of the invention illustrated by Figs. 1–3, where the axes of bars or tubes 8 are off-set with respect to the links of chain 1, the cross section of shaft 3 (as shown by Fig. 1) does not fill the gap as well as in the case of the embodiments of Figs. 7 and 8, but this cross section is however the best possible one for this construction. The composite shaft of Fig. 4 constituted by two tubes 12 assembled by plates 13 constitutes only an approximate solution but is advantageous in view of its simplicity of construction.

Figure 9:
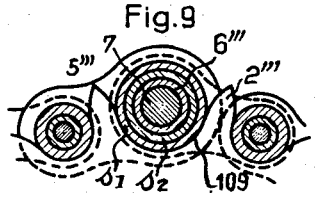
Figs. 9 and 10 are a diagrammatic cross section on the line IX—IX of Fig. 10, and a plan view, respectively, of a portion of a modification.
Figure 10:
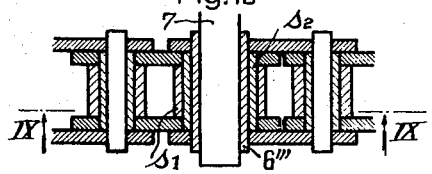

Although it has been found advantageous, especially for the reasons just above mentioned, to make the fixation links of a length at least approximately equal to twice the length of a normal chain link, I may make use, as shown by Figs. 9 and 10, of a fixation link 5''' of a length equal to that of an ordinary link. In this case the axle 7 of the supporting bar also constitutes the pin through which link 5''' is pivotally connected with the next chain link. Due to the fact that two sleeves $s_1$ and $s_2$ belonging to the chain must also be mounted on sleeve 6''', the notch 109''' to be provided in the sprocket wheel 2''' is of relatively large dimensions. The other hollows of said wheel are of conventional design.

Conveyors of the type above described must often be stopped accurately in predetermined positions, and the safest way of obtaining this result is to control the stopping thereof by fingers or projections carried by one of the endless chains.

Figure 11:
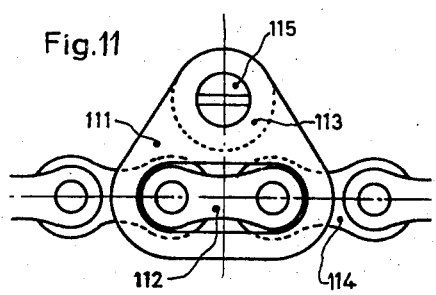
Figs. 11 and 12 are a side elevational view and a cross sectional view, respectively, of an abutment element to be mounted in an endless chain of a conveyor according to my invention.
Figure 12:
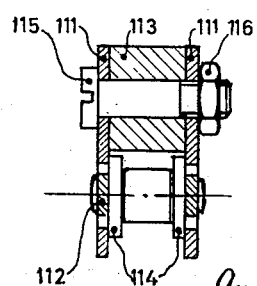

It is advantageous to be able to fix such fingers quickly at any point of a normal chain. Figs. 11 and 12 show an arrangement according to which each control finger is constituted by two small plates 111 provided with an opening corresponding substantially with the outline of an external link 112 of the chain. A transverse tube 113 extends between plates 111 so as to keep them at a distance from each other equal to the distance existing between two internal links 114 of the chain. A screw 115 and a nut 116 passing through tube 113, permit of quickly mounting and removing plates 111 at any point of an ordinary chain.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A horizontal conveyor which comprises, in combination, a frame, two driving sprocket wheels, having each the same even number of teeth, mounted in said frame at least at one end of the conveyor, said two wheels being identical, coaxial and in register with each other, two endless chains in mesh with said two wheels respectively, forming two horizontal portions respectively above and below the horizontal plane passing through the common axis of said sprocket wheels, each of said endless chains including fixation links at distances from one another equal to one half of the circumference along which said chain is being wound on the corresponding sprocket wheel supporting bars at right angles to said chains carried by said fixation links, at least two horizontal rails, parallel to said horizontal chain portions, supported by said frame, rollers freely rotatable about the axes of said bars, resting on said rails so as to run thereon, and a rigid shaft extending between said two sprocket wheels and fixed with respect thereto, at least a substantial portion of the outer surface of said shaft located opposite said supporting bars being shaped to correspond at least approximately with the surface enveloped by said bars in a reference system fixed with respect to said sprocket wheels so as to rotate with respect thereto.

2. A conveyor according to claim 1 in which said transverse supporting bars consist of tubes of circular cross-sections, and stub axles at the ends of said bars, said stub axles being journalled in said fixation links respectively.

3. A conveyor according to claim 1 in which said fixation links have a length equivalent to the total length of two consecutive ordinary chain links when they are passing around the corresponding sprocket wheel.

4. A conveyor according to claim 1 in which the portion of said shaft located opposite said transverse bars is in the shape of an 8 so as to constitute a two-tooth gear meshing with each of said bars.

5. A conveyor according to claim 1 in which said shaft is constituted by two circular tubes at a distance from each other and end plates to support said last mentioned tubes in fixed position with respect to each other.

6. A conveyor according to claim 3 in which said sprocket wheels are of conventional design and said fixation links are of a height greater than that of ordinary chain links, the axes of said supporting bars being offset outwardly with respect to said chain by an amount limited so that said axes pass between two consecutive teeth of each of said sprocket wheels when the corresponding supporting bars are rounding the end of the conveyor.

7. A horizontal conveyor which comprises, in combination, a frame, two driving sprocket wheels mounted in said frame at least at one end of the conveyor, said two wheels being identical, coaxial and in register with each other, two endless chains in mesh with said two wheels respectively, forming two horizontal portions respectively above and below the horizontal plane passing through the common axis of said toothed wheels, each of said endless chains being made of links pivotally connected to one another and including fixation links located at distances from one another equal to one half of the circumference along which said chain is being wound on the corresponding sprocket wheel, supporting bars at right angles to said chains, axles at the ends of said bars mounted in said fixation links respectively, each of said axles being located at least approximately in the plane containing the two axes about which the fixation link carrying said last mentioned axle is pivotally connected to the adjoining chain links, each of said sprocket wheels having two of its hollows, diametrally opposed to each other, larger than the other hollows thereof to form two notches in which said axles engage as the corresponding fixation links engage said sprocket wheels, at least two horizontal rails, parallel to said horizontal chain portions, supported by said frame, rollers freely rotatable about the axes of said bars, resting on said rails so as to run thereon, and a rigid shaft extending between said two sprocket wheels and fixed with respect thereto, at least a substantial portion of the outer surface of said shaft located opposite said supporting bars being shaped to correspond at least approximately with the surface enveloped by said bars in a reference system fixed with respect to said sprocket wheels so as to rotate with respect thereto.

8. A conveyor according to claim 7 in which said fixation links have a length equivalent to the total length of two consecutive ordinary chain links when they are passing around the corresponding sprocket wheel, the other hollows of said sprocket wheels being of conventional shape.

9. A conveyor according to claim 7 in which said fixation links are of a length equal to twice the length of an ordinary chain link, the other hollows of said sprocket wheels being of special shape to permit meshing of said chains with said sprocket wheels.

10. A conveyor according to claim 7 in which said fixation links are of the same length as the ordinary chain links, each axle forming a pivot pin for connection of the corresponding fixation link with an adjacent ordinary chain link.

11. A conveyor according to claim 1 further including removable control means fixed on one of said endless chains and constituted by two small plates fixed on either side of said chain and each provided with an aperture having an outline corresponding substantially to the outline of an external link of the chain.

References Cited in the file of this patent

UNITED STATES PATENTS

| | | |
|---|---|---|
| 219,871 | Olin | Sept. 23, 1879 |
| 445,292 | Treat | Jan. 27, 1891 |
| 1,468,804 | Contant | Sept. 25, 1923 |
| 1,788,866 | Griffiths | Jan. 13, 1931 |
| 2,257,230 | Drake | Sept. 30, 1941 |
| 2,656,940 | Sumners | Oct. 27, 1953 |